(12) United States Patent
Zabel et al.

(10) Patent No.: US 11,277,689 B2
(45) Date of Patent: Mar. 15, 2022

(54) APPARATUS AND METHOD FOR OPTIMIZING SOUND QUALITY OF A GENERATED AUDIBLE SIGNAL

(71) Applicant: Logitech Europe S.A., Lausanne (CH)

(72) Inventors: Calhoun Ernst Zabel, Vancouver, WA (US); Daniel Ryan Marquez, Vancouver, WA (US); Matthew James Green, Vancouver, WA (US); Douglas George Morton, Southborough, MA (US)

(73) Assignee: LOGITECH EUROPE S.A., Lausanne (CH)

( * ) Notice: Subject to any disclaimer, the term of this patent is extended or adjusted under 35 U.S.C. 154(b) by 0 days.

(21) Appl. No.: 16/944,053

(22) Filed: Jul. 30, 2020

(65) Prior Publication Data

US 2021/0266667 A1 Aug. 26, 2021

Related U.S. Application Data

(60) Provisional application No. 62/980,955, filed on Feb. 24, 2020.

(51) Int. Cl.
*H03G 5/00* (2006.01)
*H04R 3/04* (2006.01)
(Continued)

(52) U.S. Cl.
CPC ............... *H04R 3/04* (2013.01); *G10L 19/02* (2013.01); *G10L 21/02* (2013.01); *G10L 25/51* (2013.01);
(Continued)

(58) Field of Classification Search
CPC ......... H04R 3/04; H04B 17/318; G10L 19/02; G10L 21/02; G10L 25/51
See application file for complete search history.

(56) References Cited

U.S. PATENT DOCUMENTS 5,715,319 A 2/1998 Chu
7,106,876 B2 9/2006 Santiago
(Continued)

OTHER PUBLICATIONS

InvenSense. Microphone Array Beamforming. AN-1140. 2013. 12 pages.

(Continued)

*Primary Examiner* — Simon King
(74) *Attorney, Agent, or Firm* — Patterson & Sheridan, LLP

(57) ABSTRACT

The present disclosure generally provides an apparatus and method of controlling an audible signal generated by an audio device to improve the sound quality of the generated audible signal and/or sound quality perceived by a user. In some embodiments, the audio device is able to improve the sound quality generated by the audio device that is generating audible sound based on any type of audio signal. The processes described herein allow the audible signal processor to determine the acoustic fingerprint of the environment in which the audio device is positioned, and thus by use of the method steps disclosed herein to optimize the sound quality in one or more frequency bands of a generated audible signal in real time based on the determined acoustic fingerprint.

24 Claims, 7 Drawing Sheets

(51) Int. Cl.
*H04B 17/318* (2015.01)
*G10L 19/02* (2013.01)
*G10L 25/51* (2013.01)
*G10L 21/02* (2013.01)

(52) U.S. Cl.
CPC ....... *H04B 17/318* (2015.01); *H04R 2430/01* (2013.01)

(56) References Cited

U.S. PATENT DOCUMENTS

| | | |
|---|---|---|
| 7,415,117 B2 | 8/2008 | Tashev et al. |
| 8,046,219 B2 | 10/2011 | Zurek et al. |
| 8,054,990 B2 | 11/2011 | Gratke et al. |
| 8,861,756 B2 | 10/2014 | Zhu et al. |
| 9,111,522 B1 | 8/2015 | Worley, III |
| 9,274,744 B2 | 3/2016 | Hart et al. |
| 9,294,860 B1 | 3/2016 | Carlson |
| 9,336,767 B1 | 5/2016 | Barton et al. |
| 9,396,731 B2 | 7/2016 | Herre et al. |
| 9,430,931 B1 | 8/2016 | Liu et al. |
| 9,432,769 B1 | 8/2016 | Sundaram et al. |
| 9,456,276 B1 | 9/2016 | Chhetri |
| 9,484,030 B1 | 11/2016 | Meaney et al. |
| 9,516,241 B2 | 12/2016 | Kim et al. |
| 9,521,486 B1 | 12/2016 | Barton |
| 9,542,947 B2 | 1/2017 | Schuster et al. |
| 9,560,441 B1 | 1/2017 | McDonough, Jr. et al. |
| 9,560,451 B2 | 1/2017 | Eichfeld et al. |
| 9,570,071 B1 | 2/2017 | Hart et al. |
| 9,584,642 B2 | 2/2017 | Kadiwala et al. |
| 9,591,404 B1 | 3/2017 | Chhetri |
| 9,654,868 B2 | 5/2017 | Benattar |
| 9,900,688 B2 | 2/2018 | Wang et al. |
| 9,913,030 B2 | 3/2018 | Bernardini et al. |
| 9,980,042 B1 | 5/2018 | Benattar et al. |
| 9,984,675 B2 | 5/2018 | Schuster et al. |
| 10,003,846 B2 * | 6/2018 | Harkness ........... H04N 21/4398 |
| 2003/0000724 A1 | 4/2003 | Graumann |
| 2003/0072456 A1 | 4/2003 | Graumann |
| 2004/0002236 A1 | 11/2004 | Lo |
| 2004/0223623 A1 | 11/2004 | Lo |
| 2005/0001312 A1 | 6/2005 | Robinson et al. |
| 2005/0131299 A1 | 6/2005 | Robinson et al. |
| 2005/0002546 A1 | 11/2005 | Blank et al. |
| 2006/0001570 A1 | 7/2006 | Lee et al. |
| 2006/0157028 A1 | 7/2006 | Lee et al. |
| 2006/0002394 A1 | 10/2006 | Mao et al. |
| 2006/0239471 A1 | 10/2006 | Mao et al. |
| 2006/0002456 A1 | 11/2006 | Michaud et al. |
| 2006/0245601 A1 | 11/2006 | Michaud et al. |
| 2007/0000255 A1 | 2/2007 | Zalewski et al. |
| 2007/0025562 A1 | 2/2007 | Zalewski et al. |
| 2009/0001060 A1 | 4/2009 | Zurek et al. |
| 2009/0106021 A1 | 4/2009 | Zurek et al. |
| 2009/0002797 A1 | 11/2009 | Bauml et al. |
| 2009/0279724 A1 | 11/2009 | Bauml et al. |
| 2010/0000146 A1 | 1/2010 | Wolff et al. |
| 2010/0014690 A1 | 1/2010 | Wolff et al. |
| 2010/0280638 A1 * | 11/2010 | Matsuda ................. G06F 3/165 700/94 |
| 2011/0000198 A1 | 1/2011 | Ishibashi et al. |
| 2011/0019836 A1 | 1/2011 | Ishibashi et al. |
| 2011/0002742 A1 | 11/2011 | Tashev et al. |
| 2011/0274291 A1 | 11/2011 | Tashev et al. |
| 2012/0003271 A1 | 12/2012 | Chhetri et al. |
| 2012/0327115 A1 | 12/2012 | Chhetri et al. |
| 2013/0000515 A1 | 2/2013 | Morcelli et al. |
| 2013/0051577 A1 | 2/2013 | Morcelli et al. |
| 2013/0182855 A1 * | 7/2013 | Choi .................... H04R 5/04 381/23.1 |
| 2013/0002021 A1 | 8/2013 | Tammi et al. |
| 2013/0202114 A1 | 8/2013 | Tammi et al. |
| 2013/0003154 A1 | 11/2013 | Visser et al. |
| 2013/0315402 A1 | 11/2013 | Visser et al. |
| 2014/0002702 A1 | 9/2014 | Ivanov et al. |
| 2014/0002783 A1 | 9/2014 | Bastyr et al. |
| 2014/0270202 A1 | 9/2014 | Ivanov et al. |
| 2014/0270217 A1 | 9/2014 | Ivanov et al. |
| 2014/0270248 A1 | 9/2014 | Ivanov et al. |
| 2014/0278394 A1 | 9/2014 | Bastyr et al. |
| 2014/0003509 A1 | 11/2014 | Schuster et al. |
| 2014/0350926 A1 | 11/2014 | Schuster et al. |
| 2014/0350935 A1 | 11/2014 | Schuster et al. |
| 2015/0000950 A1 | 4/2015 | Bisani et al. |
| 2015/0095026 A1 | 4/2015 | Bisani et al. |
| 2015/0003047 A1 | 10/2015 | Delikaris-Manias et al. |
| 2015/0304766 A1 | 10/2015 | Delikaris-Manias et al. |
| 2015/0304772 A1 * | 10/2015 | Risberg ................. H04R 3/002 381/55 |
| 2016/0000949 A1 | 3/2016 | Vallabhan et al. |
| 2016/0094910 A1 | 3/2016 | Vallabhan et al. |
| 2016/0001570 A1 | 6/2016 | McCracken |
| 2016/0001739 A1 | 6/2016 | Li et al. |
| 2016/0157028 A1 | 6/2016 | McCracken |
| 2016/0173978 A1 | 6/2016 | Li et al. |
| 2016/0002419 A1 | 8/2016 | Thyssen et al. |
| 2016/0241955 A1 | 8/2016 | Thyssen et al. |
| 2017/0000407 A1 | 2/2017 | Woollen |
| 2017/0040710 A1 | 2/2017 | Woollen |
| 2017/0000619 A1 | 3/2017 | An et al. |
| 2017/0000708 A1 | 3/2017 | Lu et al. |
| 2017/0061953 A1 | 3/2017 | An et al. |
| 2017/0070814 A1 | 3/2017 | Lu et al. |
| 2017/0115954 A1 * | 4/2017 | Innes .................... G06F 40/226 |
| 2017/0001541 A1 | 6/2017 | Arora et al. |
| 2017/0164102 A1 | 6/2017 | Ivanov |
| 2018/0136899 A1 * | 5/2018 | Risberg ................. H04R 3/04 |
| 2018/0139560 A1 | 5/2018 | Shi et al. |
| 2018/0158446 A1 | 6/2018 | Miyamoto et al. |
| 2018/0002260 A1 | 8/2018 | Huang et al. |
| 2018/0226086 A1 | 8/2018 | Huang et al. |

OTHER PUBLICATIONS

John Eargle, "The Microphone Book", Second Edition. 2004. 43 pages.

* cited by examiner

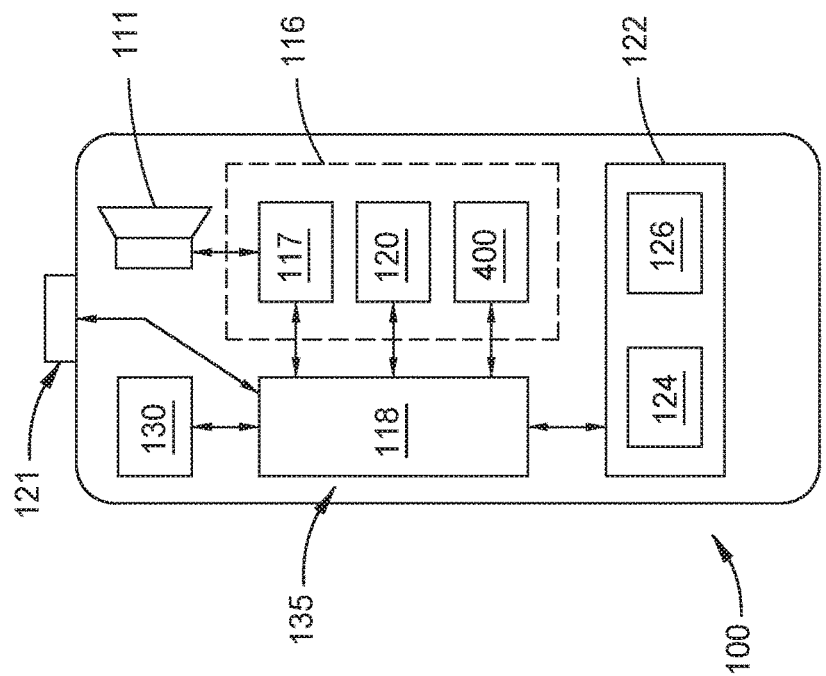
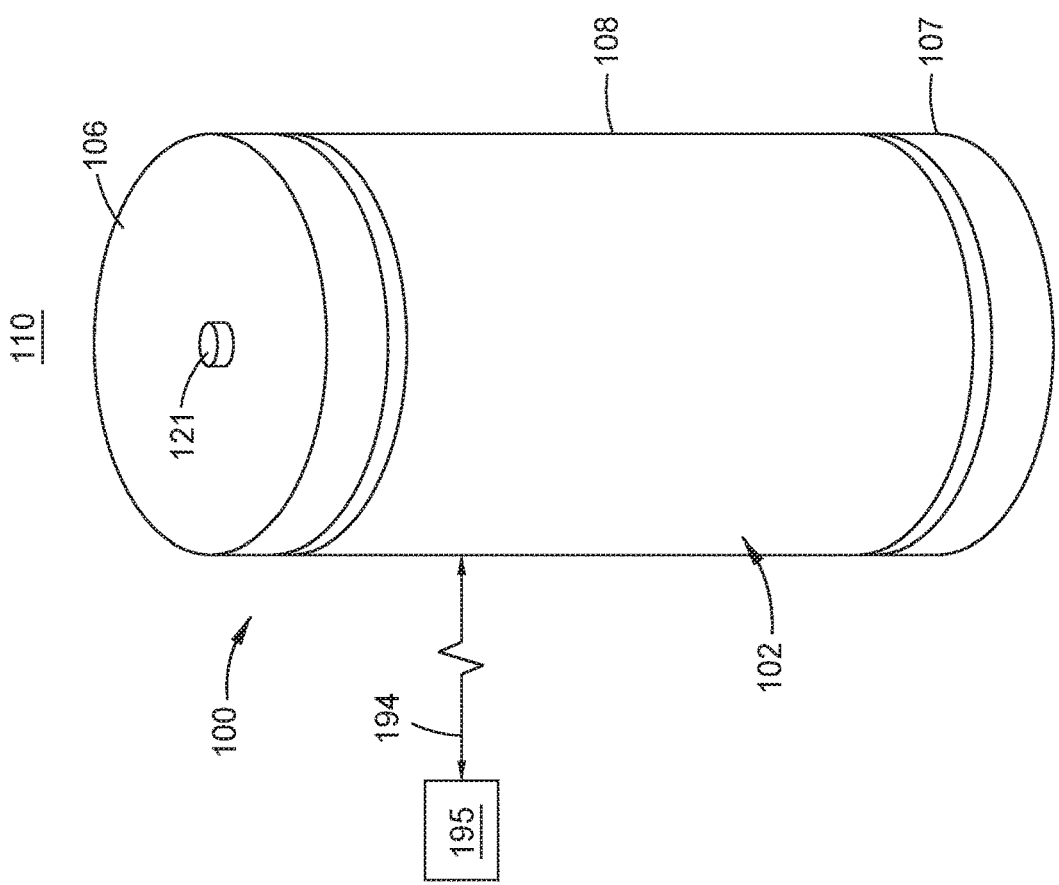
FIG. 1B
FIG. 1A

APPARATUS AND METHOD FOR OPTIMIZING SOUND QUALITY OF A GENERATED AUDIBLE SIGNAL

CROSS-REFERENCE TO RELATED APPLICATIONS

This application claims the benefit of U.S. Provisional Patent Application No. 62/980,955, filed Feb. 24, 2020, which is incorporated by reference in its entirety.

BACKGROUND OF THE INVENTION

Field of the Invention

Embodiments of the present disclosure relate to a method and apparatus for detecting and processing audible signals to improve a generated audible signal output.

Description of the Related Art

The popularity and reliance on electronic devices has increased dramatically in the past decade. As the number of electronic devices and the reliance on these electronic devices has increased, there has been an increased desire for these devices to generate an audio output signal that is true to the original audio source's sound quality and thus is free from environmental interference that often adversely affects the sound quality in different portions of the sound or acoustic spectrum generated by an audible signal generating device (e.g., audio speaker).

With the advent of mobile media players, such as smartphones, iPods®, personal audio players and other devices, there has been an effort to develop audio devices that receive a stream of digital and/or analog information that is translated using various electronic circuit elements into sound via one or more audio speakers. Typically, audio devices, such as smartphones, wireless speakers, loudspeakers or headphones, include an enclosure and at least one acoustic transducer, or driver, which has a diaphragm that produces sound waves by converting an electrical signal into mechanical motion, and thus generate sound waves by physically moving air at various frequencies. However, the perceived sound quality generated by these acoustic transducers can vary greatly depending on their position within an environment, attributes of the environment in which they are positioned and/or additional acoustic elements that interfere with the generated sound waves.

Therefore, there is need for an audio device that provides a high-quality sound output regardless of where it is positioned within its local environment or the presence of other environmental factors that affect the generated sound quality perceived by a user. The devices, systems, and methods disclosed herein are designed to overcome these deficiencies.

SUMMARY OF THE INVENTION

Embodiments of the disclosure generally include an audio device, comprising an audio speaker that is configured to generate an audible signal based on a received media content signal that comprises a media containing file, one or more microphones contained within the body of the audio device that are configured to detect the audible signal generated by the audio speaker; and an audible signal processor. The audible signal processor is generally configured to process the audible signal detected by the microphone, generate a reference signal from the received media content signal, process the reference signal, compare the processed audible signal detected by the microphone and the processed reference signal to determine a difference in sound quality in one or more frequency ranges within the acoustic range of the received media content signal or detected audible signal, adjust a characteristic of media content signal in the one or more frequency ranges to form an adjusted media content signal, wherein the adjustment of media content signal is based on the comparison of the processed audible signal detected by the microphone and the processed reference signal, and cause the audio speaker to generate an adjusted audible signal based on the adjusted media content signal.

Embodiments of the disclosure generally include a method of generating an audible signal, comprising generating, by a speaker, an audible signal based on a received media content signal that comprises a media containing file, detecting, by a microphone, the audible signal generated by the audio speaker processing the detected audible signal, generating a reference signal from the received media content signal, processing the reference signal, comparing the time smoothed reference signal and the time smoothed detected audible signal to determine a difference in sound quality in at least one of the one or more frequency ranges of the time smoothed reference signal and the time smoothed detected audible signal, adjusting a characteristic of a received media content signal to form an adjusted media content signal, and generating an audible signal based on the adjusted media content signal. The process of adjusting the received media content signal can be based on the comparison of the time smoothed reference signal and the time smoothed detected audible signal. The process of processing the detected audible signal comprises adjusting the sound level of the detected audible signal relative to a reference level, filtering the detected audible signal, wherein filtering the detected audible signal comprises separating the detected audible signal into one or more frequency ranges, determining a root-mean-square (RMS) value of the detected audible signal within at least one of the one or more frequency ranges, and time smoothing the detected audible signal within each of one or more frequency ranges. The process of processing the reference signal comprises adjusting the sound level of the generated reference signal relative to a reference level, filtering the generated reference signal, wherein filtering the generated reference signal comprises separating the generated reference signal into one or more frequency ranges, determining a root-mean-square (RMS) value of the generated reference signal within at least one of the one or more frequency ranges, and time smoothing the generated reference signal within each of one or more frequency ranges.

Embodiments of the disclosure also include a method of generating an audible signal, comprising analyzing a first portion of a media content signal, wherein analyzing the first portion of the media content signal comprises determining a characteristic of the first portion of the media content signal in one or more signal frequency ranges within a frequency spectrum of the media content signal, generating an audible signal from the first portion of the media content signal, detecting the generated audible signal, analyzing the detected audible signal, wherein analyzing the detected audible signal comprises determining a characteristic of the detected audible signal in one or more signal frequency ranges within a frequency spectrum of the detected audible signal, comparing the determined characteristic of the detected audible signal and the determined characteristic of the first portion of the media content signal in at least one of the one or more signal frequency ranges to determine a difference, attenuating or enhancing a second portion of the media content signal in at least one of the one or more signal frequency ranges to form an adjusted media content signal, wherein an amount of attenuation or enhancement applied to the media content signal is based on the determined difference in the at least one of the one or more signal frequency ranges, and generating an adjusted audible signal based on the adjusted media content signal.

Embodiments of the disclosure also include a method of attenuating or enhancing an audible signal, comprising delivering a media content signal to a plurality of low-shelf filters that are each configured to alter the media content signal at frequencies below a different cut off frequency, applying a first coefficient to an acoustic signal provided from an output of a first filter of the plurality of low-shelf filters to form a first filtered acoustic signal, applying a second coefficient to an acoustic signal provided from an output of a second filter of the plurality of low-shelf filters to form a second filtered acoustic signal, and combining the first and second filtered acoustic signals to form a third filtered acoustic signal. In some embodiments, a value for each of the first and second coefficients is selected based on a comparison of a determined characteristic of a detected audible signal, which is created by generating an audible signal from a portion of the media content signal, and a determined characteristic of the portion of the media content signal in at least one of the one or more signal frequency ranges. The method may further comprise applying a first attenuation coefficient to the media content signal to form a first attenuated acoustic signal, applying a second attenuation coefficient to the third filtered acoustic signal to form a second attenuated acoustic signal, and combining the first attenuated acoustic signal and the second attenuated signal, wherein a value of the first and second attenuation coefficients are selected based on the comparison of the determined characteristic of a detected audible signal and the determined characteristic of the portion of the media content signal. The combined first attenuated acoustic signal and second attenuated signal is configured to form at least a portion of an attenuation or enhancement of the media content signal in at least one of the one or more signal frequency ranges to form an adjusted media content signal.

Embodiments of the disclosure also include a method of attenuating or enhancing an audible signal, comprising delivering a media content signal to a plurality of filters that are each configured to alter the media content signal at frequencies above or below a different cut off frequency, applying a first coefficient to an acoustic signal provided from an output of a first filter of the plurality of filters to form a first filtered acoustic signal, applying a second coefficient to an acoustic signal provided from an output of a second filter of the plurality of filters to form a second filtered acoustic signal, and combining the first and second filtered acoustic signals to form a third filtered acoustic signal. The third filtered acoustic signal is configured to form at least a portion of an attenuation or enhancement of a portion of the media content signal in at least one of the one or more signal frequency ranges to form an adjusted media content signal. In some embodiments, a value for each of the first and second coefficients is selected based on a comparison of a determined characteristic of a detected audible signal, which is created by generating an audible signal from a portion of the media content signal, and a determined characteristic of the portion of the media content signal in at least one of the one or more signal frequency ranges.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1A is a schematic diagram illustrating an example of an audio device assembly, according to one or more embodiments of the present disclosure.

FIG. 1B is a schematic block diagram of device components found within the audio device assembly shown in FIG. 1A, according to one or more embodiments of the present disclosure.

Figure 2A:
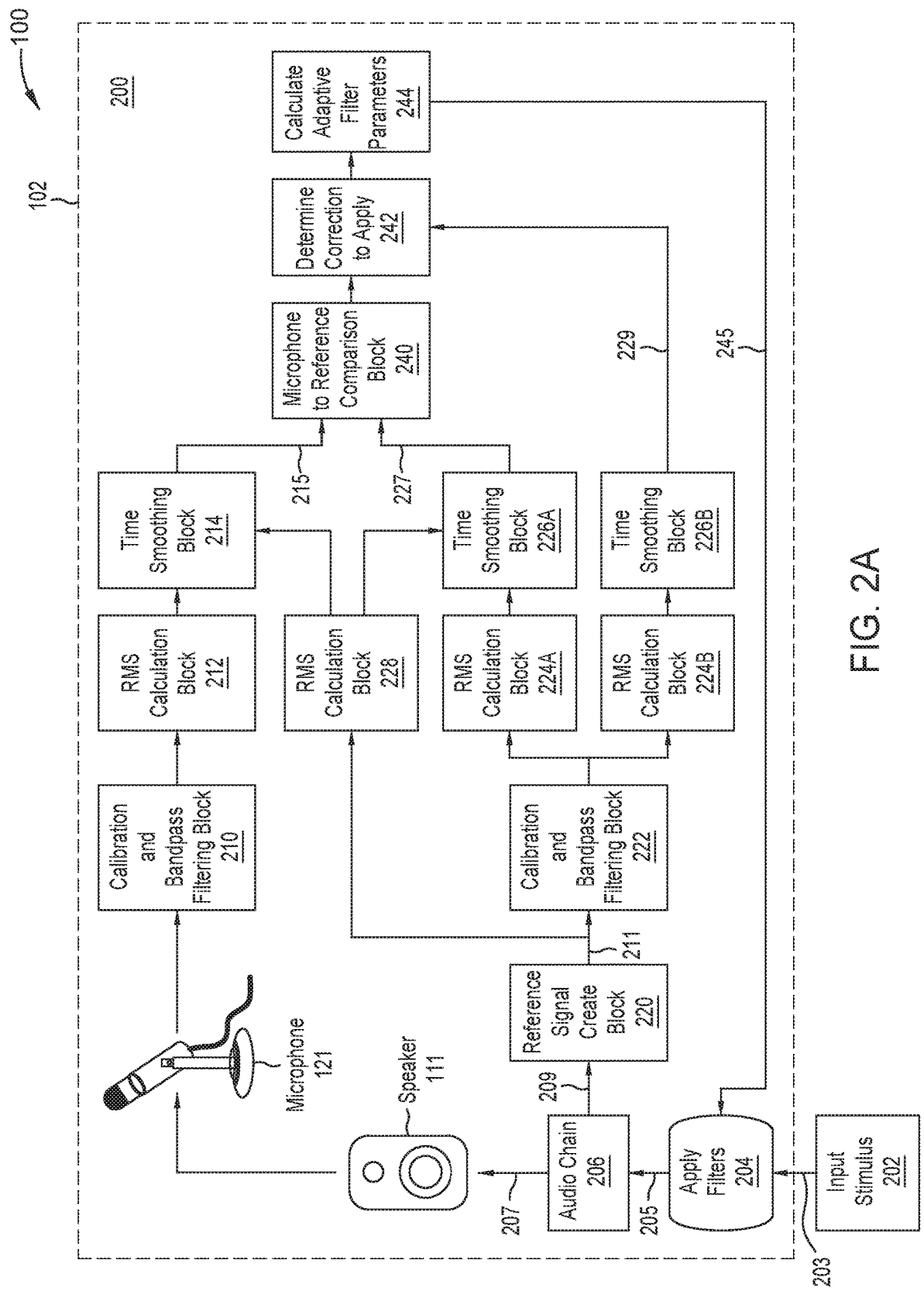
FIG. 2A is a schematic diagram illustrating a plurality of functional blocks that are performed by the components within an audible signal processor within an audio device to generate an audible signal that has a desired sound quality, according to one or more embodiments of the present disclosure.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

In the following description, numerous specific details are set forth to provide a more thorough understanding of the embodiments of the present disclosure. However, it will be apparent to one of skill in the art that one or more of the embodiments of the present disclosure may be practiced without one or more of these specific details. In other instances, well-known features have not been described in order to avoid obscuring one or more of the embodiments of the present disclosure.

The present disclosure generally provides an apparatus and method of controlling an audible signal generated by an audio device to improve the sound quality of the generated audible signal and/or improve the sound quality of the generated audible signal perceived by a user. In some embodiments, the audio device is able to improve the sound quality generated by the audio device using any type of incoming audio signal, and thus without the need to use calibration tones that are specifically formed to detect and/or adjust for deficiencies in the generated audible output of the audio device as commonly utilized in conventional sound quality adjustment processes. It is believed that one or more of the embodiments of the disclosure provided herein could be used in any audio device design or audio playback application, but may provide additional advantages when used in a wireless speaker, headphones, headsets, earphones, in-ear monitors or other audio playback devices that may be regularly positioned and repositioned in an environment that has an undesirable effect on the generated sound quality and/or sound quality experienced by a user.

Embodiments of the disclosure include a sound generating device, which is referred to herein as an audio device, that contains an audio generating device (hereafter audio speaker or speaker), one or more audible signal sensing devices (hereafter microphones) and an audible signal processor (e.g., controller) that is configured to detect and analyze an audible signal that is generated by the audio speaker, and then adjust one or more characteristics of a subsequently generated audible signal based on the analysis of the detected audible signal. The adjustments made to the one or more characteristics of a subsequently generated audible signal can be made, for example, to account for any undesirable effects caused by the environment in which the audio device is positioned. Environments in which the audio device may exhibit different generated audible signal characteristics, when playing the same audio containing file (e.g., MP3, M4P, WAV, MPEG, video file), include different types of three dimensional (3-D) spaces that have differing acoustics, such as an auditorium, conference room, bedroom, or outdoor environment, or even when the audio device is placed in differing positions within the same 3-D environment (e.g., corner versus center of a room). A signal processing technique utilized by the audible signal processor to improve the sound quality of a generated audible signal may be generally adapted to adjust characteristics of audible signals within one or more different frequency ranges, for example, frequency ranges within an acoustic spectrum that extends between 20 hertz (Hz) and 20,000 Hz, such as between about 20 Hz and about 17,000 Hz. In one example, the signal processing technique is generally adapted to detect and adjust characteristics of the audible signal within one or more of a low frequency range (e.g., 20-300 Hz), an intermediate frequency range (e.g., 300-4000 Hz) and a high frequency range (e.g., >4000 Hz). In another example, the signal processing technique is generally adapted to detect and adjust characteristics of the audible signal within one or more of a low frequency range (e.g., 20-100 Hz), and a wide band frequency range (e.g., 100-300 Hz).

Audio Device Configuration Example

FIG. 1A is a schematic diagram illustrating an example of an audio device assembly 100, according to one or more embodiments of the present disclosure. The audio device assembly 100 will generally include an audio device 102. The audio device 102 can be an electronic device that can be used as a standalone device or a device that can be used in combination with other electronic devices. In one example, as shown in FIG. 1A, the audio device 102 is able to communicate with a separate second electronic device 195 over a wired or wireless communication link 194. Alternately, in another example, the audio device 102 is a component within the second electronic device 195. In either case, the audio device 102 may be a wireless speaker, video camera device that includes a CCD camera, a keyboard, smart phone, a speaker phone, home automation device, video conferencing device or other useful electronic device. In one example, the audio device 102 may be an Ultimate Ears HyperBoom™ speaker, Ultimate Ears Boom™ speaker, a Logitech BCC 950™ video conferencing device that are all available from Logitech USA of Newark Calif. or Logitech Europe S.A of Lausanne, Switzerland. The audio device 102 or the second electronic device 195 may also be an iPod®, iPhone®, iPad®, Android™ phone, Samsung Galaxy®, Squeeze™ box, Microsoft Surface®, laptop or other similar device. In some embodiments, the second electronic device 195 is a smart phone, laptop, tablet, video conferencing system or other electronic device that is configured to communicate with the audio device 102 using a wired or wireless technique. While the discussion below primarily describes or provides examples of an audio device assembly 100 that is a standalone portable electronic device this configuration is not intended to be limiting as to the scope of the disclosure provided herein.

The audio device 102 will include one or more audible signal detection devices that are positioned on one or more surfaces of the audio device 102. The one or more audible signal detection devices will be referred to hereafter as a microphone 121, which may include a single microphone or a plurality of microphones. The audio device 102 may be any desirable shape, such as the cylindrical shape shown in FIG. 1A, and may include one or more exterior surfaces on which the microphone 121 may be positioned, such as a top surface 106, a side surface 108 and a supporting surface 107. The supporting surface 107 is a surface on which the whole audio device 102 may rest during normal operation. The microphones 121 can be any type of electrical device that is able to convert air pressure variations of a sound wave into an electrical signal, and thus may include, but are not limited to a dynamic microphone, condenser microphone, piezoelectric microphone, fiber optic microphone, ribbon microphone, MEMS microphone or other similar device. In some embodiments, the microphone 121 is an omnidirectional microphone that is able to detect audible signals from all directions.

In general, the microphone 121 within the audio device 102 is positioned so that the microphone 121 can detect audible signals arriving from any direction. Thus, the audio device 102 is able to receive an audible signal directly or indirectly generated by the audio speaker 111 (FIG. 1B) positioned within the audio device 102. In general, the speaker 111 comprises one or more electromechanical devices (i.e., electroacoustic transducers or drivers) that is configured to convert mechanical motion into sound energy or sound pressure level (SPL).

FIG. 1B is a schematic diagram illustrating an electronic assembly 135 within the audio device assembly 100, according to one embodiment of the present disclosure. In general, the electronic assembly 135 will include a processor 118, non-volatile memory 122, power source 130 that are used to form an audible signal processor 200, which is discussed below. During operation, the electronic assembly 135 is configured to receive an electrical signal that is based on an audible signal received by the microphone 121. The processor 118 then receives the detected electrical signals generated by the microphone 121 and processes the detected input using one or more signal processing techniques that are performed by use of one or more software algorithms stored in the non-volatile memory 122 to analyze and generate control parameters (e.g., filtering coefficient values) that are used to adjust and generate an audible signal that has a desired sound quality.

The electronic assembly 135 may include the processor 118 that is coupled to input/output (I/O) devices 116, the power source 130, and the non-volatile memory unit 122. As noted above, the memory 122 may include one or more software applications 124, and also include stored media data 126 that is used by the processor 118 to perform various parts of the methods described herein. The processor 118 may be a hardware unit or combination of hardware units capable of executing software applications and processing data. In some configurations, the processor 118 includes a central processing unit (CPU), a digital signal processor (DSP), an application-specific integrated circuit (ASIC), and/or a combination of such units. The processor 118 is generally configured to execute the one or more software applications 124 and process the stored media data 126, which may be each included within the memory unit 122. The audible signal processor 200, which is described in more detail below, utilizes the processor 118 and a software application 124 (i.e., software algorithm) stored in memory 122, which includes a number of instructions which, when executed by the processor 118, causes the audible signal processor 200 to perform one or more of the methods and operations described herein.

The I/O devices 116 are coupled to memory unit 122 and processor 118, and may include devices capable of receiving input and/or devices capable of providing output. The I/O devices 116 include the audio processing device 117 which receives the battery power and an input signal (e.g., media content signal), and produces an output signal which may be received and then broadcast by the audio speaker 111 (e.g., generated audible signal). In some embodiments, the audio speaker 111 includes multiple audio transducers (i.e., audio speakers), such as, for example, a left woofer, a left tweeter, a right woofer and a right tweeter that are each able to generate an audible output based on at least a portion of the media content signal provided from an audio signal source (e.g., second electronic device 195). The I/O devices 116 also include one or more wireless transceivers 120 that are configured to establish one or more different types of wired or wireless communication links with other transceivers residing within other electronic devices. A given transceiver within the I/O devices 116 could establish the communication link 194, for example, a Wi-Fi communication link, near field communication (NFC) link or a Bluetooth® communication link (e.g., BTLE, Bluetooth classic), among other types of communication links with similar components in the second electronic device 195. In some embodiments, electronic components within the I/O device 116 are adapted to transmit signals processed by the audio device 102 to other internal electronic components found within the audio device assembly 100 and/or to electronic devices that are external to the audio device assembly 100.

The memory unit 122 may be any technically feasible type of hardware unit configured to store data. For example, the memory unit 122 could be a hard disk, a random access memory (RAM) module, a flash memory unit, or a combination of different hardware units configured to store data. The software application 124, which is stored within the memory unit 122, includes program code that may be executed by processor 118 in order to perform various functionalities associated with the audio device 102. The stored media data 126 may include any type of information that relates to a desired control parameter, time delay information, prior stored audio signal RMS information, user data, electronic device configuration data, device control rules or other useful information. The stored media data 126 may include information that is delivered to and/or received from the second electronic device 195. The stored media data 126 may reflect various data files, settings and/or parameters associated with the environment, audible signal processing device control and/or desired behavior of the audio device 102. While the audio device assembly 100 illustrated in FIGS. 1A-1B and most of the subsequent discussion below include a single microphone 121 this configuration is not intended to be limiting as to the scope of the disclosure provided herein. Other microphone positions, orientations and numbers of microphones could also be used to perform one or more aspects of the disclosure provided herein.

Audible Signal Processor Example

Figure 2B:
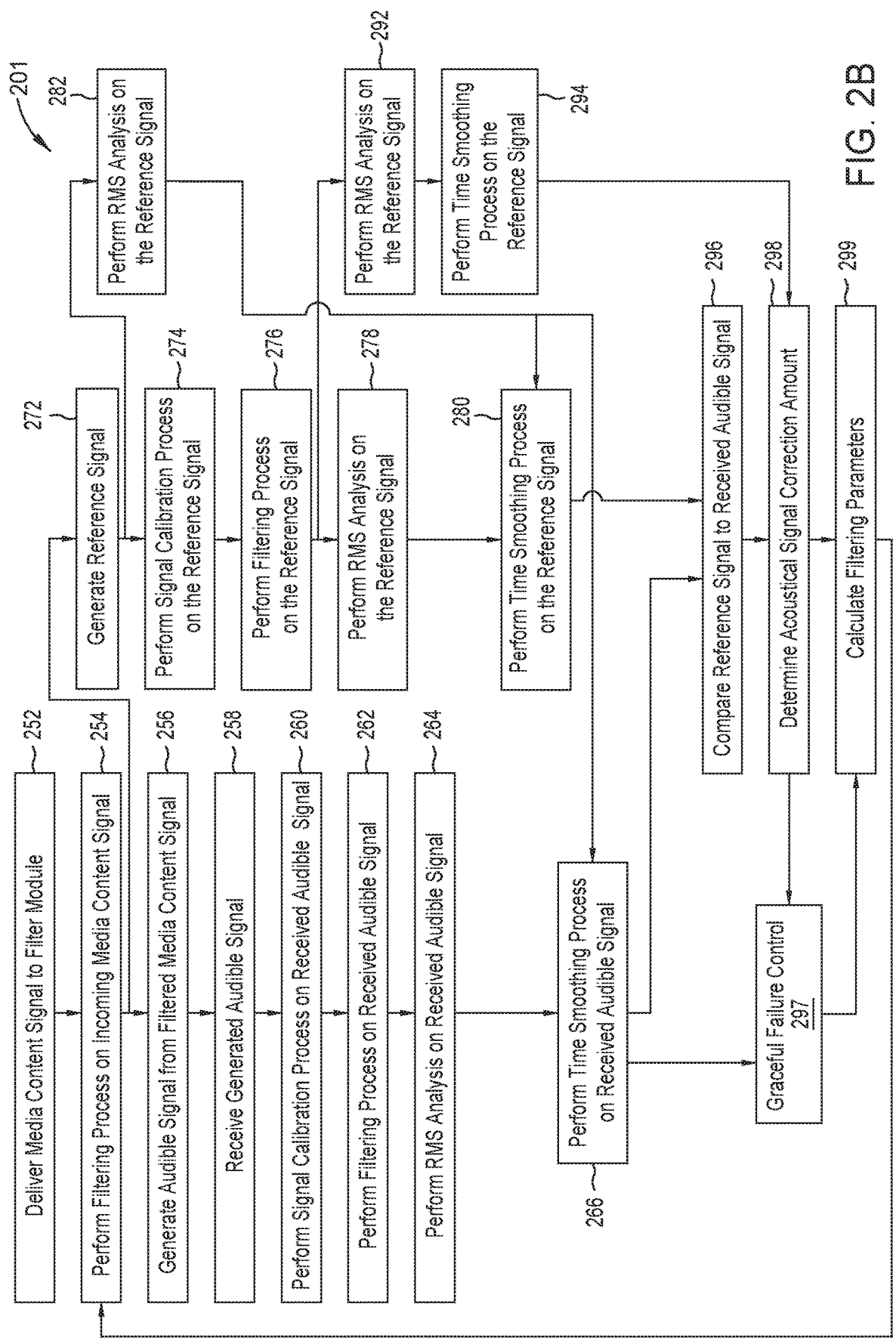
FIG. 2B is a flow chart illustrating the method steps performed by the components in the audible signal processor, according to an embodiment of the disclosure.

FIG. 2A is a schematic diagram illustrating various signal processing functional blocks that are performed by one or more hardware and software components within the audio device assembly 100, according to one or more embodiments of the present disclosure. Each of the signal processing functional blocks are used to perform at least a portion of a method 201 (FIG. 2B) of adjusting and controlling the generation and delivery of an audible signal that has a desired sound quality. The collective group of signal processing functional blocks, or signal processing elements, form an audible signal processor 200 within the audio device 102. FIG. 2B is a flow chart illustrating the various operations performed by the hardware and software components in the audible signal processor 200 during the performance of method 201, according to an embodiment of the disclosure.

The one or more hardware and software components within the audible signal processor 200 are configured to receive an input stimulus from an input device 202 via a communication link 203. The input device 202 and communication link 203 are generally equivalent to and form at least part of the second electronic device 195 and wired or wireless communication link 194, which are described above. In some embodiments, the input stimulus, such as a media content signal, may include media content that includes digital or analog data that forms music or other useful audio containing file that can be electronically transmitted from the input device 202. The media content signal includes an acoustic signal that includes information regarding the music or audio containing file at various frequencies across the acoustic spectrum of the media content signal. In some configurations, the media content provided within the media content signal can include music (e.g., MP3 files) provided from Pandora®, Deezer® or Spotify®, or even video (e.g., MP4 files) from Netflix®. In some configurations, the media content provided within the media content signal can include a stream of or packets of audio information provided from electronic components within a video conferencing system, and the audible signal that is being produced and improved by the processes disclosed herein include speech or other sounds provided from one or more remote video conferencing locations.

At operation 252, the input device 202 of the audible signal processor 200 delivers a media content signal that contains a media content file (e.g., MP3, MP4, AAC, WMA, etc.), via the communication link 203, to a filter module 204.

In some embodiments, the media content file includes an artistic composition, such as a song, music or other types of compilations that a user would want to listen to for pleasure or to learn (i.e. something other than a test tone, or other media composition that a user would recognize as a composition intended to be used for audio calibration purposes).

Figure 3A:
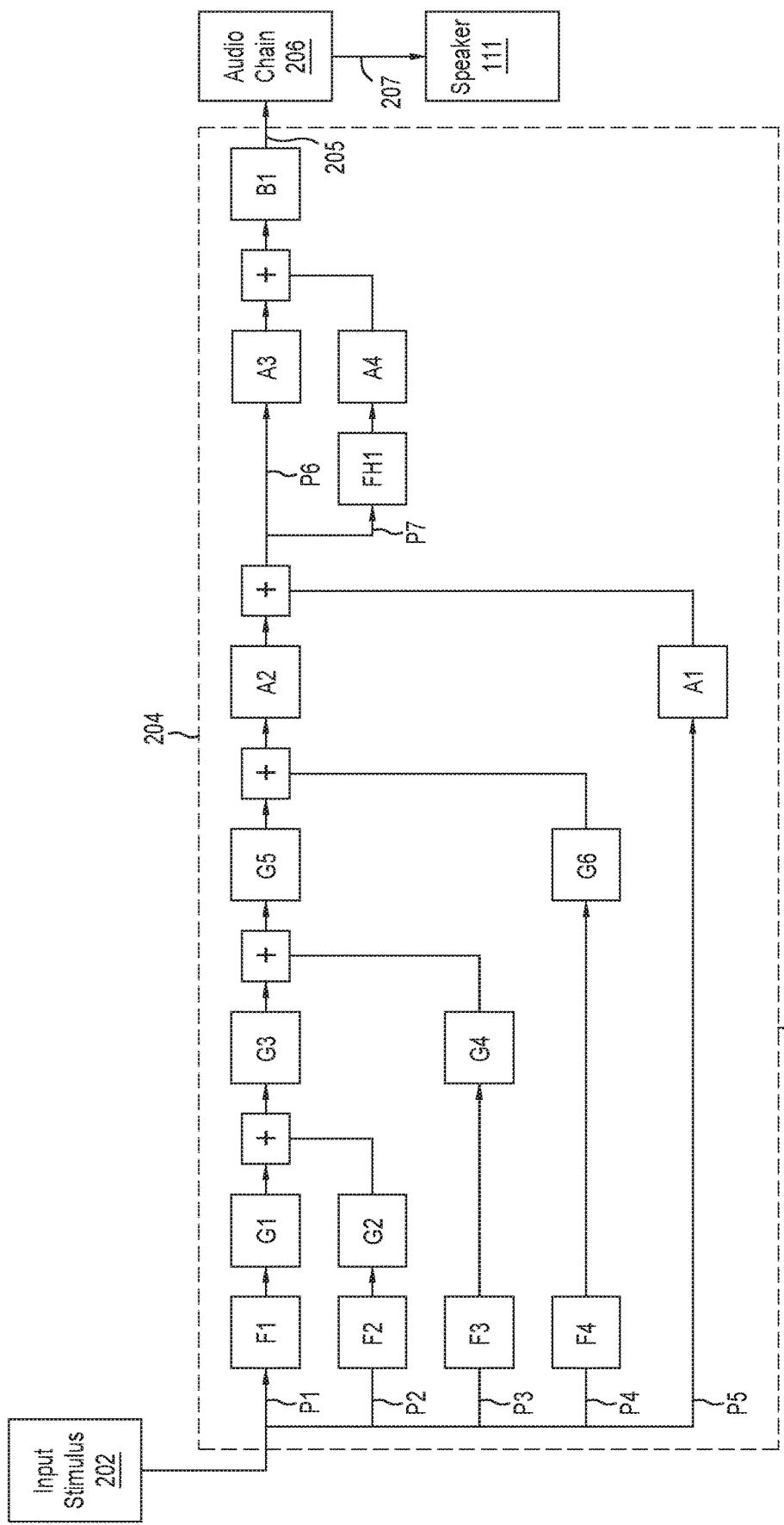
FIG. 3A is a flow chart illustrating an input signal filtering process performed by the components in the audible signal processor, according to an embodiment of the disclosure.

At operation 254, the filter module 204 is used to adjust one or more characteristics of the acoustic signal within the delivered media content signal by applying a filtering process to the incoming media content signal received in operation 252 to form a filtered media content signal. In some embodiments, the filtering process includes the use of a plurality of band pass filters that are configured to break-up the media content signal into a plurality of frequency bands that are then each separately altered based on filtering coefficient values (e.g., gain coefficients or attenuation coefficients) that are input by a controller within the audible signal processor 200 to attenuate, or in some cases enhance, the acoustic signal within the media content signal within each of the frequency bands to allow a desired audible signal to be subsequently generated by the audio speaker 111. In one embodiment, the filter module 204 is configured to provide a desired amount of attenuation to one or more portions of the acoustic signal within the media content signal based on a first filtering coefficient value set. In one example, the filter module 204 is configured to provide a desired amount of attenuation to the acoustic signal within a band between 20-300 Hz, or even a band between 100-300 Hz, based on the first filtering coefficient value set that is stored in memory of the audio device 102. A schematic diagram illustrating an example of a filtering process that is performed by one or more hardware and software components within the audio device assembly 100 is shown in FIG. 3A. In general, the filtering process performed by the filter module 204 is used to adjust one or more of the equalization settings in the audio device so that a generated audible signal provided from the audio device 102 is optimized for the current location within an external environment. During the initial pass through the processing sequence illustrated in method 201, the filtering coefficients can be set to an initial value, which has not yet been optimized for the current environment in which the audio device 102 has been placed, since an optimization portion of the method 201 have not yet been completed.

During operation 254 the filtered media content signal may pass through an audio chain 206 that includes hardware that is adapted to allow the received filtered media content signal to be delivered along two separate paths 207 and 209. As shown in FIGS. 2A and 2B, the path 207 is used to feed the filtered media content signal to the speaker 111 so that operation 256 can be performed, and path 209 is used to feed the filtered media content signal to a reference signal creation block 220 that is configured to perform operation 272. The audio chain 206 is generally configured to separate the filtered media content signal into the frequency ranges of each of the speakers 111 in the audio device 102, such as, for example, dividing the media content signal into a tweeter signal (e.g., >1000 Hz) and woofer signal (e.g., <1000 Hz) so that a desired audible signal is generated from each of the speakers within the speaker 111 of the audio device 102.

At operation 256, the filtered media content signal, formed during operation 254, is then transferred to the speaker 111 that is then used to generate an audible signal. The generated audible signal created by the speaker 111 may be formed by use of one or more transducers, such as a single driver, or a woofer and a tweeter, or even two pairs of woofers and tweeters.

At operation 258, a microphone 121 of the audio device 102 receives the audible signal generated by the one or more transducers within the speaker 111. Since the generated audible signal interacts with the environment that is external to the audio device 102, the attributes or characteristics of the received audible signal will be affected by the generated audible signal's interaction with various physical and acoustic features of the environment external to the audio device 102. Thus, as noted above, one or more characteristics of received audible signals can have undesirable acoustic characteristics within one or more frequency ranges within an acoustic range of the audio device 102 (e.g., range between 20 Hz and 20 kHz).

At operation 260, a signal calibration process is performed by the calibration element 210 on the audible signal received by the microphone 121 to assure that the sound level of the received audible signal (e.g., electrical signal) matches the sound level of the reference signal (e.g., electrical signal). The calibration process will include comparing the received audible signal sound level with the reference level to determine a calibration coefficient. The pre-calibrated sound level value can be formed by positioning the audio device 102 in an isolation chamber and adjusting the gain on the microphone 121 to match, in an ideal environment, the sound level (dB) of the reference signal generated at operation 272, and thus the sound level of the electrical signal provided to the speaker 111. By comparing the received audible signal's sound level with the reference signal level the audible signal processor 200 can determine if, for example, the environment is causing an increase or decrease in the sound received in the audible signal, and thus allowing the audible signal processor 200 to adjust the sound level (e.g., attenuate or boost) of the received audible signal, by use of the calibration coefficient, for use in subsequent processing steps.

At operation 262, a signal filtering process is performed on the received audible signal after the calibration process and adjustment has been performed in operation 260. In some embodiments, the filtering process performed during operation 262 can include the use of a plurality of band pass filters that are configured to break-up the received audible signal into a plurality of frequency ranges that match the audible signal output regions created by each of the transducers of the speaker 111. Thus, in one example, the signal filtering process causes the received audible signal to be broken up into two or more separate frequency ranges that are useful to help decipher the acoustic effects of the environment in which the audio device has been positioned. In this example, the two or more separate frequency ranges can then be separately analyzed and further processed. In some embodiments, the two or more separate frequency ranges can be in at least one of a low frequency range (e.g., 20-300 Hz), an intermediate frequency range (e.g., 300-4000 Hz) and a high frequency range (e.g., >4000 Hz). For example, the two or more separate frequency ranges include at least a low frequency range (e.g., 20-100 Hz), and a wide band frequency range (e.g., 100-300 Hz). In another example, each of the two or more separate frequency ranges are in different frequency ranges, such as at least one band being in the low frequency range (e.g., 20-300 Hz), and at least one other band being in the intermediate frequency range (e.g., 300-4000 Hz) or the high frequency range (e.g., >4000 Hz).

At operation 264, a signal root-mean-squared (RMS) analysis is performed on each of the frequency ranges separated during filtering process performed during operation 262 to determine the RMS value of each of the audible signals within each of the frequency ranges.

At operation 266, a time averaging or signal smoothing process is performed by the components within the RMS calculation block 212 on the different audible signal bands by averaging the determined RMS signal values over a fixed period of time (e.g., typically between about 1-5 seconds). The time averaging process will smooth out rapid changes in the RMS values of the audible signal, and thus allow only real, non-transitory and/or long term effects of the environment on the generated audible signal to be accounted for during the application of method 201. If operation 266 was left out of method 201, rapid changes in the audible signal would generally cause rapid changes in the eventual optimized audible signal, which is discussed below. Rapid changes in the optimized audible signal is typically undesirable in most audio signal generation or playback cases.

After performing operation 266 the information found in the received audible signal, which was processed using operations 260-266, is then transferred to operation 296, which is discussed further below.

Figure 4:
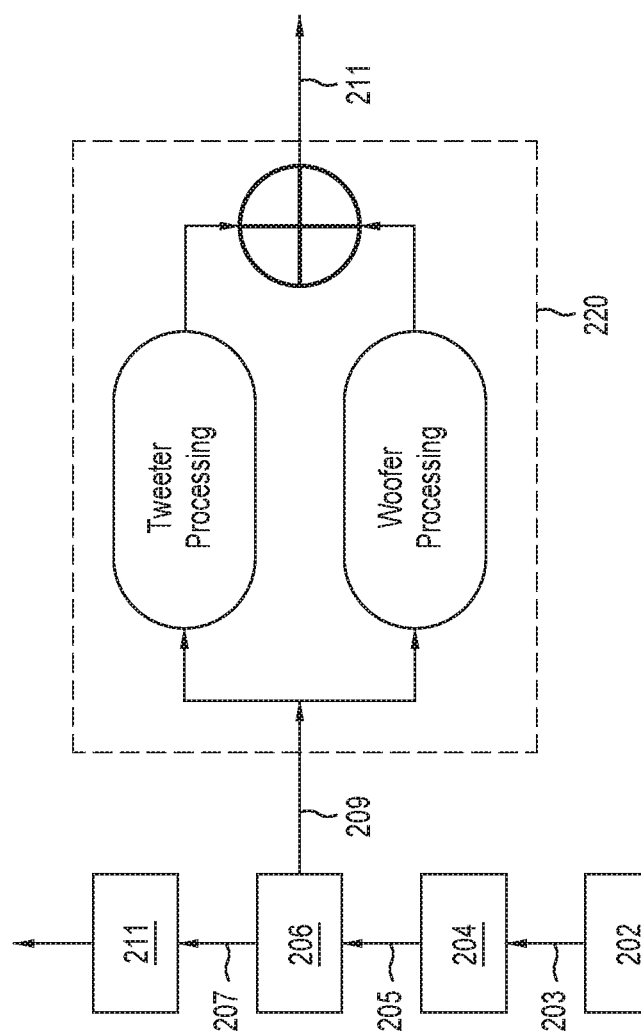
FIG. 4 is a flow chart illustrating a reference signal filtering process performed by the components in the audible signal processor, according to an embodiment of the disclosure.

Referring back to FIG. 2B, at operation 272, a reference signal generation process is performed on the filtered media content signal that is received from the audio chain 206 along path 209 before the filtered media content signal is received by the speaker 111. Thus, the operations 272-294 of method 201 are performed in parallel on the same filtered media content signal that was used to form the generated audible signal created within operation 258. In some embodiments, during operation 272 a process of recombining the filtered media content signal, which was divided up into the frequency ranges during an operation performed by the audio chain 206, is performed. In this example, the two or more separate speaker related frequency ranges are separately processed and then summed together, as shown in FIG. 4, to form a "filtered acoustic reference signal." In this example, the bands containing acoustic signals in which the tweeters will generate an audible signal may be further processed before they are summed together with their respective left or right side lower frequency acoustic signals (e.g., woofer signals) to prevent future operations from being affected by the use of the combined signals. Optionally, in one example, during an initial phase of the operation 272 the reference signal block 220 (FIG. 2A) will add a time delay to each of the frequency ranges to match the time delay experienced by the microphone 121 in receipt of the generated audible signals from each of the transducers of speaker 111. A goal of the processes performed during operation 272 and other subsequent steps is to adjust the reference signal(s) so that the acoustic signals in each of the two or more different frequency ranges of the reference signal can be directly compared with each of the two or more different frequency ranges of the generated audible signals during operation 296, which is discussed further below.

At operation 274, a signal calibration process is performed by the calibration element 222 on the filtered acoustic reference signal to assure that the sound level of the filtered acoustic reference signal will match the sound level of the audible signal received by the microphone 121 during operation 258. The calibration process will include comparing the filtered acoustic reference signal's sound level with the reference signal level to determine the calibration coefficient. The calibration coefficient can be determined during pre-calibration process described above during operation 260.

At operation 276, a signal filtering process is performed on the filtered acoustic reference signals after the calibration process and adjustment has been performed in operation 274. In some embodiments, the filtering process performed during operation 276 can include the use of a plurality of band pass filters that are configured to break-up the filtered acoustic reference signal into a plurality of frequency ranges that are useful to help decipher the acoustic effects of the environment in which the audio device has been positioned. Thus, in one example, the signal filtering process causes the filtered acoustic reference signal to be broken up into two or more separate frequency ranges that are useful to help decipher the acoustic effects of the environment in which the audio device has been positioned. In this example, the acoustic signals within the two or more separate frequency ranges can then be separately analyzed and further processed. In some embodiments, the two or more separate frequency ranges are similarly configured and/or defined as the bands used in operation 262 described above.

At operation 278, a signal root-mean-squared (RMS) analysis is performed on the acoustic signals within each of the frequency ranges separated during filtering process performed during operation 276, by the components within block 224A, to determine the RMS value in each of the frequency ranges of the signal filtered filtered acoustic reference signal.

At operation 280, a time averaging or signal smoothing process is performed, by the components within block 226A, on the each of the RMS values determined for the acoustic signals in each of the two or more separate frequency ranges by averaging the RMS values over a fixed period of time (e.g., between about 1-5 seconds). The time averaging process will smooth out rapid changes in the RMS values of the filtered acoustic reference signal, and thus allow only real, non-transitory and/or long term effects of the environment on the filtered acoustic reference signal to be accounted for during method 201.

Referring back to FIG. 2B, at operation 282, a signal root-mean-squared (RMS) analysis is performed on the complete filtered acoustic reference signal (e.g., full acoustic frequency range), by the components within block 228, to determine the RMS value of the unfiltered/undivided filtered acoustic reference signal formed after performing operation 272. The RMS value determined during operation 282 is also referred to herein as the full range RMS value. Since the unfiltered/undivided filtered acoustic reference signal contains information across the complete frequency range, and thus contains portions of each of the two or more separate frequency ranges that are being analyzed in other operations, changes in the full range RMS value can be used to determine if large scale changes to the information found in the media content signal delivered in operation 252 has occurred, which is likely a sign of an error in the media content signal. Therefore, to avoid undesirable fluctuations in the generated audible signal formed during operation 256, due to the receipt of the error containing media content signal, adjustments to one or more of the two or more separate frequency ranges can be determined to be undesirable by components within the audible signal processor 200 during one or more operations performed in method 201, such as during the time smoothing processes in operations 266 and 280. For example, a significant change in the determined full range RMS value can occur when the bass portion (e.g., 20-300 Hz) of the unfiltered/undivided filtered acoustic reference signal drops out due to an error within the received media content signal, a portion of the acoustic reference signal is not present for a period of time (e.g., bass portion), or due to a signal transmission error created during the delivery of the media content signal from the input device 202. For example, it may not be desirable to alter the media content signal that is to be generated from the error containing audible signal during operations 266 and 280, since the error containing media content signal may undesirably affect or skew these time smoothing processes due to the error induced large variation in the media content signal. To enable the correction to the outputs of operations 266 and 280, due to the reduced signal processing steps and/or by use of added buffering steps within the method 201, the results of operation 282 are created before the operations performed on the same audible signal in operations 266 and 280 are performed. The information generated in operation 282 and provided to the process(es) performed in operations 266 and 280 is used to allow the audible signal processor 200 to determine if the time smoothing process result applied to the RMS values generated during operations 264 and 278 should be altered due to the presence of the error containing media content signal and/or momentary lack of bass in the music content itself. The full range RMS value is used to determine a threshold value (e.g., full range threshold value) that is used to determine when the time smoothing adjustment is applied to the RMS values of the two or more separate frequency ranges.

Referring back to FIG. 2B, at operation 292, a signal root-mean-squared (RMS) analysis is performed on a portion of the filtered acoustic reference signal, by a RMS calculation block 224B, that has a formed band width wider than the bandwidth of the filtered acoustic reference signal processed in operation 278 to determine the RMS value of a "wide band" portion (e.g., range of 100-300 Hz) of the filtered acoustic reference signal formed after performing operation 276.

At operation 294, a time averaging or signal smoothing process is performed on the "wide band" portion of the filtered acoustic reference signal, by the time smoothing block 226B, by averaging the RMS values of the "wide band" portion of the filtered acoustic reference signal over a fixed period of time (e.g., between about 1-5 seconds) based on the RMS values determined in operation 292. The time averaging process will smooth out rapid changes in the RMS value of the "wide band" portion of the filtered acoustic reference signal. The information obtained during operations 292-294 can be used by the audible signal processor 200 to help determine the amount of correction that is needed to be made to the one or more separate frequency ranges to achieve a desired loudness and sound quality, as discussed below in conjunction with operation 298.

As discussed above, prior to performing operation 296 of method 201, the filtered media content signal is provided or transferred along two separate paths (e.g., paths 207 and 209) that each separate the filtered media content signal into the two or more separate frequency ranges so that various analyses can be performed on an RMS signal formed from the signals found in each of the two or more separate frequency ranges. Therefore, at operation 296, the received RMS signals generated in operation 266, and the RMS signals generated in operation 280 are compared to determine if one or more portions of the acoustic range of a subsequent incoming media content signal (e.g., received during operation 252) within each of the two or more separate frequency ranges should be adjusted. In one example, by comparing the information received after performing operations 266 and 280 the audible signal processor 200 is able to determine that the portion of generated audible signal in one of the two or more separate frequency ranges, such as a frequency range between 20-300 Hz, or frequency range between 100-300 Hz, needs to be adjusted to provide a desired sound quality for a subsequently generated audio signal created by the speaker 111 using a subsequent incoming media content signal.

As shown in FIGS. 2A and 2B, the path 207 is used to feed the filtered media content signal to the speaker 111 so that operations 256-266 can be performed, and path 209 is used to feed the filtered media content signal to a reference signal creation block 220 so that at least operations 272-282 can be performed. During operation 296 the RMS signal in each of the two or more separate frequency ranges generated in operation 266 are compared with the RMS signal in each of the two or more separate frequency ranges generated in operation 280 to determine if one or more portions of the acoustic range of a subsequent incoming media content signal (e.g., received during operation 252) within each of the two or more separate frequency ranges should be adjusted. Thus, the RMS values calculated in operations 266 and 280 in each frequency range are compared with each other so that a determination of a frequency range RMS difference ($\Delta$) can be created to help decide whether an adjustment is required in each frequency range. In the comparison the magnitude of the frequency range RMS difference ($\Delta$) and the sign (i.e., positive or negative) of the determined RMS difference can be collected to help determine the effect the environment has on the audible signal generated by the audio device 102. The sign of the determined RMS difference can be used to determine if the environment is providing a signal attenuation or boost in a frequency range. In one example, the RMS signal generated in operation 266 in a first frequency range (e.g., 20 Hz-100 Hz) is compared with the RMS signal generated in operation 280 for the same first frequency range (e.g., 20 Hz-100 Hz) to determine a first frequency range RMS difference ($\Delta_1$), and the RMS signal generated in operation 266 in a second frequency range (e.g., 100 Hz-300 Hz) is compared with the RMS signal generated in operation 280 for the same second frequency range (e.g., 100 Hz-300 Hz) to determine a second frequency range RMS difference ($\Delta_2$), which is then used in operation 298 to determine if portions of a subsequent incoming media content signal needs to be adjusted in the first frequency range and/or the second frequency range.

At operation 298 the audible signal processor 200 then determines the magnitude of the adjustment that needs to be made to incoming media content signal (e.g., received during operation 252) based on information stored within the memory of the audible signal processor 200. In some embodiments, the information stored in memory includes a correction function that can be used to determine the desired amount of adjustment that is to be applied to an incoming media content signal within each of the two or more different frequency ranges based at least in part on the results received from operation 296.

In some embodiments of operation 298, based on psycho-acoustic related information stored in memory, the audible signal processor 200 may also compare the information received after performing operation 296 with a psycho-acoustic based threshold level to determine if an adjustment to the sound quality within one or more frequency ranges is desirable since an adjustment may be perceived by a user as an improvement based on playback sound levels, the adjustment may be in a range in which humans have a sensitivity to certain frequency ranges (e.g., psycho-acoustic effect) or other known acoustic adjustments that most users would or would not prefer. For example, if the comparison performed in operation 296 of information received from operations 266 and 280 shows that the environment in which the audio device 102 is positioned is causing a bass boost, the audible signal processor 200 may decide not to make an adjustment if the playback level is determined to be low enough that it is desirable to keep the added bass since humans tend to be less sensitive to frequencies in the bass range at lower playback levels.

Figure 5A:
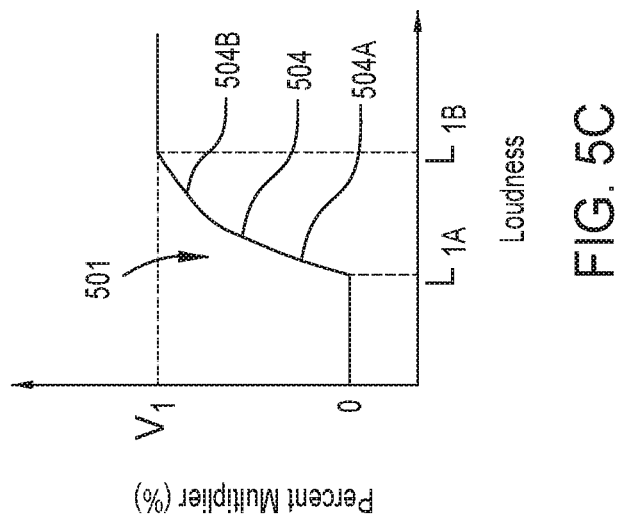
FIGS. 5A, 5B and 5C illustrate scaling coefficient plots used in processes to adjust the sound quality of a generated audible signal, according to one or more embodiments of the disclosure.
Figure 5B:
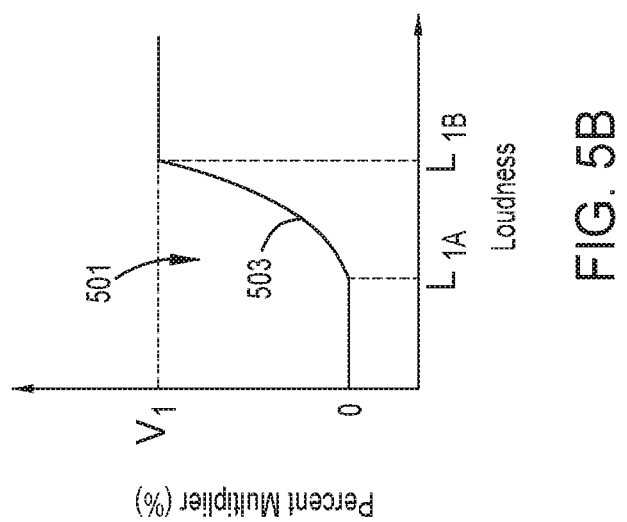
Figure 5C:
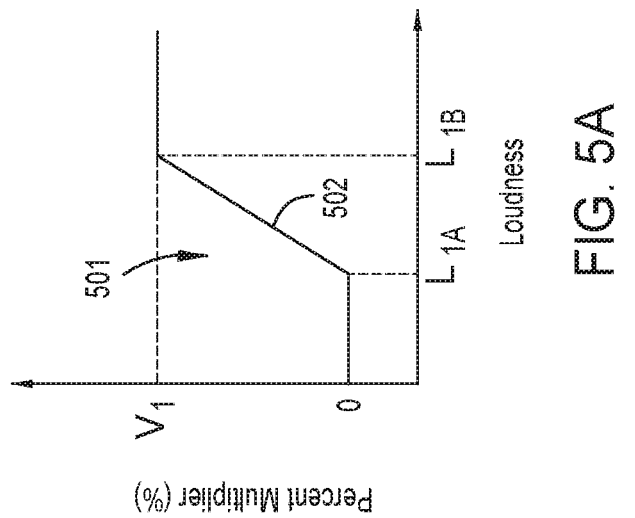

FIGS. 5A-5C illustrate various types of scaling coefficient plots that each include a correction function that is used in operation 298 to adjust the sound quality of a generated audible signal, according to one or more embodiments of the disclosure. The scaling coefficient plots shown in FIGS. 5A-5B are used in operation 298 to select the amount of correction that is to be applied to the RMS difference ($\Delta$), determined in operation 296, in each of the two or more separate frequency ranges based on the apparent loudness of the "wide band" portion of the filtered acoustic reference signal determined during operations 292-294. Thus, based on the magnitude of the frequency range RMS difference ($\Delta$) determined in operation 296, an amount of desired correction can be determined by applying a correction function, which is graphically illustrated in FIGS. 5A-5C by the coefficient curve 501. The desired amount of correction, or correction value V, can be determined computationally by use of an equation that defines the coefficient curve 501, by use of a table, which is stored in memory, which includes a correction amount versus frequency range RMS difference, or by some other useful computer aided method. In an effort to describe attributes of the correction function, the various features of some examples of correction functions are shown graphically in FIGS. 5A-5C. As illustrated in these scaling coefficient plots, a desired amount of correction, or correction value V (Y-axis value) can be determined by finding the point on the coefficient curve 501 that matches a loudness value L found on the X-axis of the plot. The loudness value L used in the scaling coefficient plot analysis is the "wideband" RMS value determined during operations 292-294, and thus provides input as to the loudness associated with the RMS value of the "wide band" portion of the reference signal is at the current time. Once the correction value V is determined, the RMS difference ($\Delta$), determined in operation 296, is multiplied by the correction value V to determine the desired signal correction amount that is then provided to and used in the subsequent operation 299.

In one example of a process of determining the correction value V, if the magnitude of the loudness value (L) is determined to be less than a first threshold loudness value ($L_{1A}$), in a first frequency range, the amount correction will be zero percent (i.e., no correction is desired), and if the magnitude of the frequency range RMS difference is determined to be greater than a second threshold loudness value ($L_{1B}$), in the first frequency range, the amount correction will be 100 percent of full scale. The full scale amount of correction, or maximum correction value $V_1$, can be set based on psychoacoustic effects on the generated audible sound based on testing and/or known characteristics of the audio device assembly 100. The full scale amount of correction, which is illustrated as $V_1$ in FIGS. 5A-5C, is correction value that is a percentage value that can be a signal attenuation amount or signal enhancement amount. In some embodiments, as shown in FIGS. 5A-5C, when the magnitude of the loudness value (L) is in between the first threshold value ($L_{1A}$) and the second threshold value ($L_{1B}$) the amount of desired correction determined from the correction function is also tailored to account for various psychoacoustic effects and/or physics based acoustic properties associated with each of the frequency ranges. The amount of correction per RMS signal difference in this range can be different in each frequency range within the two or more separate frequency ranges. In cases where an amount of attenuation of the frequency range RMS difference ($\Delta$), determined in operation 296, is needed based on the determined loudness value, a correction value V determined by use of the coefficient curve 501 can be set to a value between 0 percent correction (e.g., no correction is desired) and 100 percent of a set maximum correction amount. In one example, the maximum correction amount $V_1$ that can be applied to the frequency range RMS difference ($\Delta$), equates to a correction coefficient multiplier of 0.6, which if selected, is multiplied by the frequency range RMS difference ($\Delta$) to determine the maximum signal correction amount (i.e., corrected RMS difference ($\Delta_c$)). In this example, if the desired correction is less than the maximum amount, the correction coefficient value will range between no attenuation to a maximum of 60 percent attenuation, or in other words the correction coefficient value will vary between a value of 1.0 and 0.6. In cases where an amount of enhancement of the frequency range RMS difference ($\Delta$), determined in operation 296, is needed, a correction coefficient value determined by use of the coefficient curve 501 can be greater than a 100 percent, or a correction coefficient value may be in a range between 1.0 and 1.5 for example.

FIG. 5A illustrates a scaling coefficient plot that includes a coefficient curve 501 that has a substantially linear section 502 extending between a first threshold value $L_{1A}$ and a second threshold value $L_{1B}$. The first threshold value $L_{1A}$, the second threshold value $L_{1B}$ and slope of the linear section 502 can be set and/or adjusted to account for desired variations in the correction in each frequency range. FIG. 5B illustrates a scaling coefficient plot that includes a coefficient curve 501 that has a substantially non-linear shaped section 503 that extends between the first threshold value $L_{1A}$ and the second threshold value $L_{1B}$. The non-linear shaped section 503 can be a logarithmic or second-order or higher polynomial shaped curve (e.g., fourth-order or greater polynomial curve). FIG. 5C illustrates a scaling coefficient plot that includes a coefficient curve 501 that has a curve section 503 that includes at least two segments 504A, 504B that each have different correction per loudness value L (i.e., "wide-band" RMS signal value) within at least a portion of the first threshold value $L_{1A}$ and the second threshold value $L_{1B}$. Each of the at least two segments 504A, 504B can include a coefficient curve that is linear or non-linear, and thus can account for variations in the amount of correction required as the magnitude of the loudness level L increases.

In one example of a process performed in operation 298, a linear curve containing correction function similar to ones shown in FIG. 5A or 5C is used to determine a correction amount in each of a low frequency range (e.g., 20-300 Hz), an intermediate frequency range (e.g., 300-4000 Hz) and a high frequency range (e.g., >4000 Hz). In another example, a non-linear curve containing correction function similar to FIG. 5B is used to determine a correction amount in each of a low frequency range (e.g., 20-300 Hz), an intermediate frequency range (e.g., 300-4000 Hz) and a high frequency range (e.g., >4000 Hz). In yet another example, at least one linear curve containing correction function is used to determine a correction amount in a first frequency range and at least one non-linear curve containing correction function is used to determine a correction amount in a second frequency range, wherein the frequency ranges are selected from a group that includes a low frequency range, an intermediate frequency range and a high frequency range. In some embodiments, the properties of the correction functions in each of the frequency ranges is set and/or adjusted based on the psycho-acoustic characteristics associated with the frequency range.

In some embodiments of operation 298, based on a comparison of the information received after performing operation 296 it is determined that the environmental effect on the sound quality within one or more frequency ranges is outside a range or level that can be modified to make a reasonably perceptible difference to a listener, the audible signal processor 200 will decide to not make an adjustment. In one example, if the music being played from the audio device becomes quiet or a section of the music contains no bass, the audible signal processor 200 may detect this change and decide to not make an adjustment (i.e., correction coefficient value equals 1.0) since the information received after performing operation 296 is less than a first threshold value $L_{1A}$. Further, if an assessment is made that the available adjustments that can be made will negatively influence a portion of, or the overall perceived sound quality observed by a listener, the adjustments may not be implemented.

At operation 299 the audible signal processor 200 then calculates the filtering parameters that are to be applied to desirably correct the incoming media content signal, based on the received corrected RMS difference ($\Delta_c$) calculated in operation 298, before it is delivered to the speaker 111 and the audible signal is generated. During operation 299 the generated filtering parameters include a second filtering coefficient value set, which is based on the corrected RMS difference ($\Delta_c$), that is then provided to the filter module 204 so that an optimized amount of enhancement or attenuation is provided to one or more portions of the media content signal based on the determined second coefficient value set.

Referring to FIG. 3A, in some embodiments, a cascading filtering method is used to adjust one or more characteristics of an incoming media content signal by applying a filtering process to incoming media content signals received from the performance of operation 252 to form a filtered media content signal. After performing operations 254-299 at least a first time through (i.e., at least one cycle) will cause an audible signal that has an improved sound quality to be generated due to the adjustment(s) applied to one or more portions the audible signal based on the analysis and corrections performed and applied after completing operations 254-299 to a subsequently received incoming media content signal. The completion of multiple cycles and/or continually performing operations 254-299 can be used to further improve the sound quality of a generated audible signal and also account for any dynamic changes to the environment in which the audio device 102 is placed.

After performing operation 299 and at the new operation 254 step, the filter module 204 is used to adjust one or more characteristics of an incoming media content signal by applying a filtering process to the incoming media content signal to form a newly filtered media content signal. In some embodiments, the filtering process includes the use of one or more band pass filters that are each configured to alter different portions, or frequency ranges, within the incoming media content signal based on corrected RMS difference ($\Delta_c$) information received by a controller within the audible signal processor 200. The filtering process can be used to attenuate, or in some cases enhance, one or more frequency bands within the media content signal and thus cause a desirable audible signal to be subsequently generated by the audio speaker 111. In addition to the single band pass filter configuration illustrated in FIGS. 3A-3B and discussed further below, in some embodiments, multiple band pass filtration processes are applied to different portions of the incoming media content signal to improve the sound quality of the generated audible signal. The multiple band pass filtration processes can be performed by the application of multiple filtration modules 204 that are connected in series that each have different filtering frequencies (e.g., filtering frequencies F1-F4) and thus are configured to separately attenuate and/or enhance different portions of the incoming audible signal. In one example, a multiple band pass filtration process may include a first band pass filter that is configured to attenuate or enhance portions of the media content signal in a range between 100 Hz and 400 Hz, a second first band pass filter that is configured to attenuate or enhance portions of the media content signal in a range between 1000 Hz and 4000 Hz and third band pass filter that is configured to attenuate or enhance portions of the media content signal in a range greater than 4000 Hz. After the new operation 254 is performed the filtered incoming media content signal formed during operation 254 is delivered to the audio chain 206 for processing and subsequent delivery along paths 207 and 209.

During the performance of the new operation 254 on a single frequency band, which is described below in relation to the example illustrated FIGS. 3A and 3B, the incoming media content signal is split up into a plurality of filtered paths, such as five paths shown in FIG. 3A to which the filters F1-F4 are applied to four of the five paths, as shown in FIG. 3A. In one embodiment, the filters F1-F4 are low cut filters that each alter or adjust the acoustic signals in frequencies below the cut-off frequency set by the controller within the audible signal processor. For example, the incoming media content signal delivered along path P1 is filtered by filter F1 that is set to alter or adjust the signals at frequencies less than 100 Hz and leave all signals at frequencies greater than 100 Hz unaffected. The incoming media content signal delivered along path P2 is filtered by filter F2 that is set to alter or adjust the signals at frequencies less than 200 Hz and leave all signals at frequencies greater than 200 Hz unaffected. The incoming media content signal delivered along path P3 is filtered by filter F3 that is set to alter or adjust the signals at frequencies less than 300 Hz and leave all signals at frequencies greater than 300 Hz unaffected. The incoming media content signal delivered along path P4 is filtered by filter F4 that is set to alter or adjust the signals at frequencies less than 400 Hz and leave all signals at frequencies greater than 400 Hz unaffected. The incoming media content signal delivered along path P5 has no filter, and thus the incoming media content signal remains unfiltered. The frequencies that the filters F1-F4 are set to need not be the same as the two or more different frequency ranges that are described above. Each of the filter values F1, F2, F3 and F4 are set/hardcoded at different desired frequency levels based on the known physical attributes of the particular audio device 102. The filtering frequency values (i.e., cutoff frequency levels FV3-FV6 in FIG. 3B) for filters F1-F4 are set based empirical data collected from prior testing performed on the audio device 102 and stored within the memory of the audio device 102. The amount of effect that each of the filtered portions of the audible signals delivered along each of the paths P1-P5 have on the incoming media content signal will depend on the gain coefficients G1-G6 (e.g., gain values can range from 0 to 1) and attenuation coefficients A1-A2 (e.g., attenuation values can range from 0 to N, where N≥1), which are all set by audible signal processor 200 based the analysis performed at operations 296-298. The gain coefficients G1-G6 are generally used to provide an amount of correction to frequencies less than a desired cut-off frequency, which is illustrated as curve 375 in FIG. 3B, during operation 254, which is discussed further below. Separately, the attenuation coefficients A1-A2 are used to attenuate or boost the signals passing through these functional blocks.

Figure 3B:
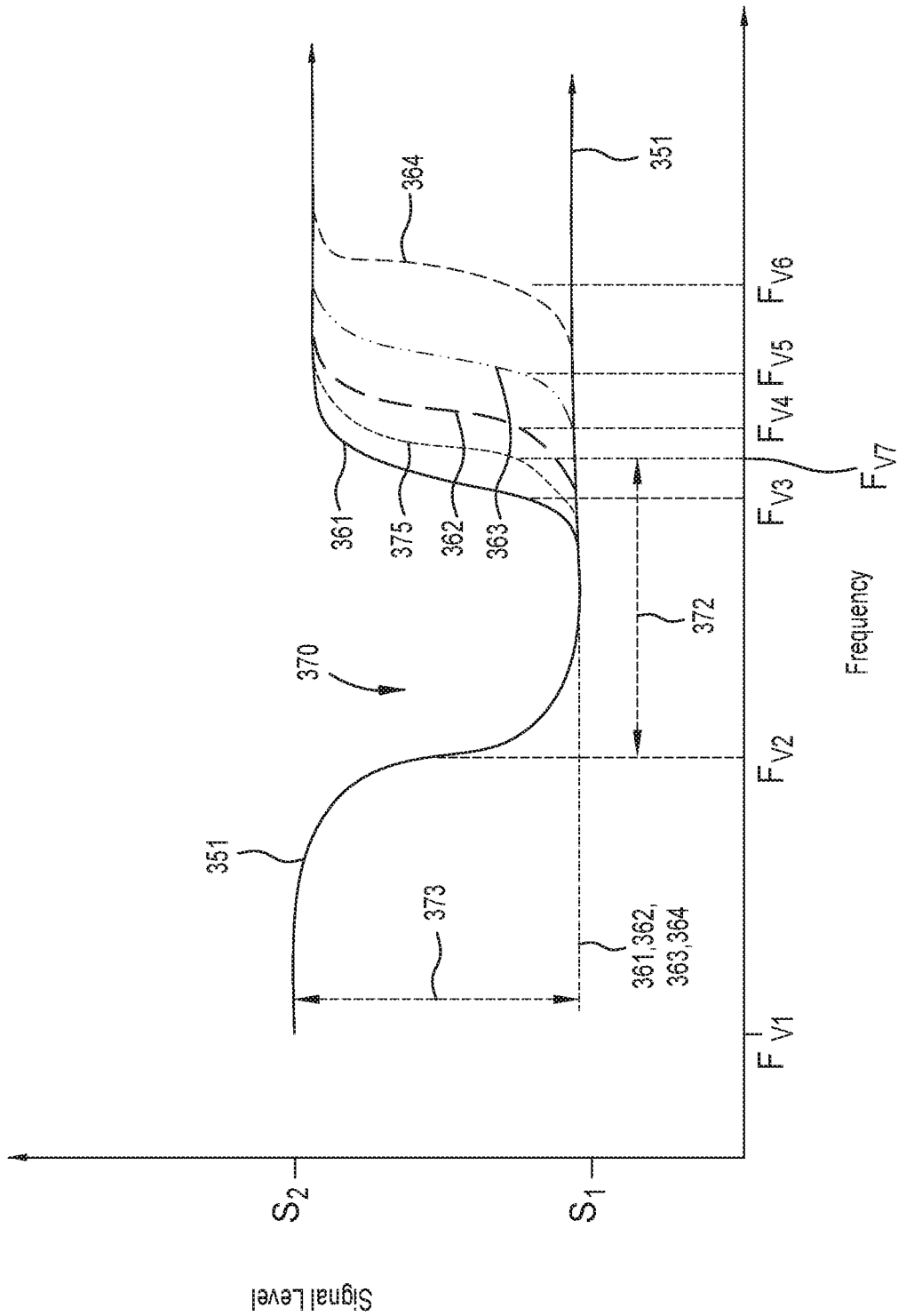
FIG. 3B illustrates low-cut and high-cut filtering curves for the filtering elements illustrated in FIG. 3A, according to an embodiment of the disclosure.

Referring to FIG. 3B, the filtration amounts applied to the audible signals delivered along each of the paths P1-P4 by the respective filters F1-F4 are pictorially illustrated, prior to their respective gain coefficient being applied. As illustrated in FIG. 3A, the incoming media content signal provided along path P1 passes through the filter F1 before the filtered signal is multiplied by the gain coefficient G1. Therefore, since the filters F1-F4 are low cut filters (e.g., only attenuate portions of a signal less than a set frequency value), the filter F1 will attenuate portions of the audible signal that is less than a first set frequency level, such as frequency level FV3 in FIG. 3B, and allow portions of the audible signal greater than the FV3 level to pass. A lower end of the audible signal range or filtration module 204 filtering range is illustrated by the frequency level FV1 in FIG. 3B, and can be in the tens of hertz range (e.g., 20 Hz). A representation of the filtered audible signal formed after passing through the filter F1 is illustrated by curve 361 in FIG. 3B. The filtered path P1 signal is then combined with the filtered signal provided from path P2, which was formed by filtering the incoming media content signal using filter F2 and then multiplying the filtered signal by the gain coefficient G2. The audible signal provided along path P2 passes through filter F2 which will attenuate a different portion of the audible signal that is less than a second set frequency level, such as frequency level FV4 in FIG. 3B, and allow portions of the audible signal greater than the FV4 level to pass. A representation of the filtered audible signal formed after passing through the filter F2 is illustrated by curve 362 in FIG. 3B. The combined filtered signals from paths P1 and P2 are then multiplied by a gain coefficient G3 and then combined with the filtered signal provided from path P3, which was formed by filtering the incoming media content signal using filter F3 and then multiplying the filtered signal by the gain coefficient G4. Thus, the audible signal provided along path P3 passes through filter F3 which will attenuate a different portion of the audible signal that is less than a third set frequency level, such as frequency level FV5 in FIG. 3B, and allow portions of the audible signal greater than the FV5 level to pass. A representation of the filtered audible signal formed after passing through the filter F3 is illustrated by curve 363 in FIG. 3B. Similarly, the combined signal from paths P1, P2 and P3 are then multiplied by a gain coefficient G5 and then combined with the filtered signal provided from path P4, which was formed by filtering the incoming media content signal using filter F4 and then multiplying the filtered signal by the gain coefficient G6. Thus, the audible signal provided along path P4 passes through filter F4 which will attenuate a different portion of the audible signal that is less than a fourth set frequency level, such as frequency level FV5 in FIG. 3B, and allow portions of the audible signal greater than the FV5 level to pass. A representation of the filtered audible signal formed after passing through the filter F4 is illustrated by curve 364 in FIG. 3B. The combined signal from paths P1, P2, P3 and P4 are then multiplied by an attenuation coefficient A2 and then combined with the attenuated signal, but unfiltered signal, provided from path P5, which was formed by multiplying the incoming media content signal by an attenuation coefficient A1. Thus, the audible signals at one or more frequencies or within one or more frequency ranges below the cut-off frequency of filter F4 can be attenuated or boosted relative to the unfiltered frequencies provide along path P5.

In the second portion of the new operation 254, the combined and attenuated signal provided from paths P1-P5 is multiplied by an attenuation coefficient A3 (see path P6) and then combined with a filtered signal provided from path P7, which was formed by use of a high cut filter, which alters or adjusts the signals at frequencies above a cut-off frequency that it is set to, using filter FH1 and then multiplying the filtered signal by the attenuation coefficient A4. Thus, the audible signal provided along path P7 passes through filter FH1 which will attenuate a portion of the audible signal that is greater than a low-end frequency level, such as frequency level FV2 (or cutoff frequency value FV2) in FIG. 3B, and allow portions of the audible signal less than the FV2 level to pass. A representation of the filtered audible signal formed after passing through the filter FH1 is illustrated by curve 351 in FIG. 3B. Thus, the audible signals at one or more frequencies or within one or more frequency ranges above the cut-off frequency of filter FH1 can be attenuated or boosted relative to the unfiltered frequencies provided along path P6. The amount of affect that each of the filtered portions of the audible signals delivered along each of the paths P6-P7 have on the incoming media content signal will depend on the attenuation coefficients A3-A4, which can be set by audible signal processor 200 based the analysis performed at operations 296 and 298, or hard coded in software. The combined and attenuated signal provided from paths P6-P7 is then multiplied by a boosting coefficient B1 to assure that the filtered incoming media content signal has a desired sound level when it is then provided to the speaker 111.

Therefore, during operation 254 a desired frequency band, having an adjustable width 372 and an adjustable attenuation or enhancement amount 373 can be created based on the adjustment and application of various gain coefficients and attenuation coefficients. In the four filter configuration example (i.e., filters F1-F4), as illustrated in FIGS. 3A-3B, the upper end of the frequency band can be adjusted to a frequency value that is greater than or equal to the frequency of the filter F1's frequency level (or cutoff frequency value FV3) and less than or equal to the filter F4's frequency level (or cutoff frequency value FV6). In a continuation of the example above, the upper end of the frequency band can be adjusted to the desired cut-off frequency, or effective frequency level FV7, by changing the gain coefficients G1-G6 such that the sum of the gain coefficient weighted filtered signals provided in paths P1-P4 generate an effective filtration curve 375 that appears in this example between the curves 361 and 362. The effective filtration curve 375 can be formed midway between curves 361 and 362 by the controller, for example, setting the gain coefficients G1 and G2 to a values of 0.49 (or 49%) and the gain coefficients G4 and G6 to a lower value, such as 0.01 (or 1%) to reduce the contribution of the higher frequency filters F3 and F4 and relatively enhance the contribution of the filters F1 and F2. Therefore, the upper end of the frequency band is set to the effective filtration curve 375 level.

In the example, illustrated in FIGS. 3A-3B, the lower end of the frequency band is set by the frequency cutoff value for the high-shelf filter, or the value of filter FH1 (i.e., cutoff frequency value FV2), which is determined and set based on the known physical attributes of the audio device 102. The amount of attenuation applied to frequencies of the audible signal above frequencies greater than the fixed frequency level FV2, can be adjusted by the controller by changing the attenuation coefficients A3-A4. The amount of attenuation or enhancement provided during operation 254, or attenuation or enhancement amount 373 (e.g., amount of variation in the signal level S2 minus S1), can be adjusted by the adjustment of and application of the attenuation coefficients A1-A4.

While not shown in FIGS. 3A-3B, the lower end of the frequency band could also include an array of additional paths that are in parallel with path P7 that are positioned in an array of high-shelf filters (not shown) that include the gain and attenuation coefficients similar to the low-shelf filter configuration (i.e., filters F1-F4) discussed above. This added configuration can allow the low-end filtration value to be adjustable in much the same way as the high-end filters allow such an adjustment.

In some embodiments, a filtration module 204 within the audible signal processor 200 may only include one or more low-shelf filters (e.g., filters F1-F4) or one or more high-shelf filters (e.g., filter FH1), and thus not be limited to only filtering the media content signal within a frequency band that has a lower limit and an upper limit. In one configuration, the filtration module 204 is configured to only attenuate or enhance portions of the media content signal that are less than a low-shelf frequency. For example, the filtration module 204 is configured to attenuate or enhance all portions of the media content signal that are less than 400 Hz. In this case, the filtration module 204 will either not include the elements found in path P7 in FIG. 3A or adjust the attributes of the filtering processes performed along paths P6-P7 so that they have minimal or no effect on the signals received from paths P1-P5. In an alternate configuration of the filtration module 204, the filtration module 204 is configured to only attenuate or enhance portions of the media content signal that are greater than a high-shelf frequency. For example, the filtration module 204 is configured to attenuate or enhance all portions of the media content signal that are greater than 4000 Hz. In this case, the filtration module 204 will either not include the elements found in paths P1-P4 in FIG. 3A or adjust the filtering processes performed along paths P1-P4 so that they have a minimal or no effect on the signals received by the elements found along paths P6-P7.

Therefore, based on the performance of method 201 at least one time through the subsequently adjusted audible signal generated during operation 256 will have an improved sound quality. Thus, operations 252-299 can be completed a plurality of times to further improve the sound quality generated by the audio device 102, and/or adjust and improve the sound quality of the audio device as it is moved within its external environment or acoustic features of the external environment change over time.

Graceful Failure Methods

Referring to FIG. 2B, in some embodiments of method 201, additional operations are added to prevent large fluctuation in the audible signal generated by the speaker 111 during the performance of operation 256. The large fluctuations in the generated audible signal will typically be caused by an over correction to an environmental effect on the generated audible signal created during steps 296-298 due to non-normal operational issues, such as unexpected and unwanted environmental effects or errors in the signal received from the second electronic device 195. The unexpected and unwanted environmental effects can include, for example, an object being positioned over the microphone 121 or the audio device being placed in a confined space, and errors in the signal received from the second electronic device 195 can include the buildup of acoustic energy created due to the audio device being placed in a confined space, the dropping out of portions of the incoming media content signal frequencies received from the second electronic device 195, or simply the delivery of the incoming media content signal has been paused on the second electronic device 195.

The additional operations, or graceful failure operations 297, provided herein are used to make sure that the adjustments made to the incoming media content signal is desirable and not due to a non-normal operating event. The graceful failure operations 297 is configured to analyze inputs generated in different parts of the method 201 and then pause and/or reset the amount of correction provided from operation 299 due to the presence of non-normal operational issues.

In a first process, the graceful failure operation 297 will analyze the results after the RMS values in operations 266 and 298 have been calculated to determine if there is a large difference between the RMS value generated from the received audible signal and the RMS value generated from the reference signal. The inputs are thus received from operations 266 and 298, as shown in FIG. 2B. A large difference from these RMS values can be caused by the microphone 121 being physically covered up, becoming damaged or detached from the audio device 102. In some embodiments, if the magnitude of the RMS difference ($\Delta$) in one or more of the frequency ranges is significantly greater than a first graceful failure threshold value ($\Delta_1$) the audible signal processor 200 will halt the adjustment to the amount of correction provided from operation 299 for at least the block of time that the magnitude of the RMS difference ($\Delta$) is on an undesirable side of the first graceful failure threshold value (i.e., above the threshold value in some cases or below the threshold value in other cases). As part of the graceful failure operation 297, when it is determined that the magnitude of the RMS difference ($\Delta$) in one or more of the frequency ranges is significantly greater than the first graceful failure threshold value ($\Delta_1$), the audio device 102 will send a signal to the second electronic device 195 so that the second electronic device 195 can generate and/or display a warning to a user that an error has occurred, and/or that the audio device 102 or microphone 121 is being obstructed, for example.

In a second process, the graceful failure operation 297 analyzes the results from operations 298 to determine if there is a large frequency range RMS difference ($\Delta$) in one of the two or more separate frequency ranges. The input provided to the graceful failure operation 297 based on the comparison completed in operation 298 is illustrated in FIG. 2B. A large positive difference between the RMS value generated from the received audible signal and the RMS value generated from the reference signal can be caused by the audio device being positioned in an enclosed space, and thus there is a very large amount of acoustic buildup provided by the environment. In some embodiments, if the magnitude of the RMS difference ($\Delta$) in one or more of the frequency ranges is significantly greater than a loudness threshold value the audible signal processor 200 will adjust the settings generated within operations 296-299 to attenuate the incoming audible signal a desired amount to minimize the effect of the undesirable acoustic buildup for at least the block of time that the magnitude of the RMS difference ($\Delta$) exceeds the loudness threshold value. In some embodiments, the desired amount of attenuation is less than the total amount of the undesirable effect (e.g., acoustic build-up amount) and may be applied in a gradual manner to avoid discrete jumps in the generated audible signal.

The one or more processes described herein allow the audible signal processor 200 to determine the acoustic fingerprint of the environment in which the audio device 102 is positioned, and thus by use of the method steps disclosed herein to optimize the sound quality in one or more frequency bands of a generated audible signal in real time based on the determined acoustic fingerprint.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method of generating an audible signal, comprising:
analyzing a first portion of a media content signal, wherein analyzing the first portion of the media content signal comprises determining a characteristic of the first portion of the media content signal in one or more signal frequency ranges within a frequency spectrum of the media content signal;
generating an audible signal from the first portion of the media content signal;
detecting the generated audible signal;
analyzing the detected audible signal, wherein analyzing the detected audible signal comprises determining a characteristic of the detected audible signal in one or more signal frequency ranges within a frequency spectrum of the detected audible signal;
comparing the determined characteristic of the detected audible signal and the determined characteristic of the first portion of the media content signal in at least one of the one or more signal frequency ranges to determine a difference;
attenuating or enhancing a second portion of the media content signal in at least one of the one or more signal frequency ranges to form an adjusted media content signal, wherein an amount of attenuation or enhancement applied to the media content signal is based on the determined difference in the at least one of the one or more signal frequency ranges; and
generating an adjusted audible signal based on the adjusted media content signal.

2. The method of claim 1, wherein
determining the characteristic of the detected audible signal comprises determining a root-mean-squared (RMS) value of the detected audible signal within a first frequency range, and
determining the characteristic of the first portion of the media content signal comprises determining a root-mean-squared (RMS) value of the first portion of the media content signal within the first frequency range.

3. The method of claim 2, wherein the first frequency range comprises a range of frequencies between 20-300 Hz.

4. The method of claim 2, wherein the attenuating or enhancing the second portion of the media content signal in at least one of the one or more signal frequency ranges comprises attenuating the second portion of the media content signal found within the frequency range between 20-300 Hz.

5. The method of claim 2, wherein the attenuating or enhancing the second portion of the media content signal in at least one of the one or more signal frequency ranges comprises attenuating the media content signal found within the frequency range between 100-300 Hz.

6. The method of claim 1, wherein the attenuating or enhancing the second portion of the media content signal further comprises:
determining an amount of attenuation or an amount of enhancement at a determined loudness value in at least one of the one or more signal frequency ranges by use of a correction function.

7. The method of claim 6, wherein the correction function comprises a first region in which the amount of the attenuation or the amount of the enhancement of the second portion of the media content signal varies linearly as the loudness value varies in magnitude.

8. The method of claim 6, wherein the correction function comprises a first region in which an amount of the attenuation or the amount of the enhancement varies non-linearly as the determined loudness value varies in magnitude.

9. The method of claim 8, wherein the correction function comprises a second region in which an amount of the attenuation or the amount of the enhancement varies linearly as the determined loudness value varies in magnitude.

10. The method of claim 6, wherein the correction function comprises a first region in which an amount of the attenuation or the amount of the enhancement varies at least partially based on psychoacoustic effects.

11. The method of claim 1, wherein forming the adjusted media content signal comprises:
delivering the second portion of the media content signal to a plurality of low-shelf filters that are each configured to alter the media content at frequencies below a different cut off frequency;
applying a first coefficient to an acoustic signal provided from an output of a first filter of the plurality of low-shelf filters to form a first filtered acoustic signal;
applying a second coefficient to an acoustic signal provided from an output of a second filter of the plurality of low-shelf filters to form a second filtered acoustic signal; and
combining the first and second filtered acoustic signals to form a third filtered acoustic signal,
wherein a value of the first and second coefficients are selected based on the determined difference for each of the one or more signal frequency ranges.

12. The method of claim 11, further comprising:
applying a first attenuation coefficient to the media content signal to form a first attenuated acoustic signal;
applying a second attenuation coefficient to the third filtered acoustic signal to form a second attenuated acoustic signal; and
combining the first attenuated acoustic signal and the second attenuated signal, wherein a value of the first and second attenuation coefficients are selected based on the determined difference of each of the one or more signal frequency ranges, and
are configured to form at least a portion of an attenuation or enhancement of the second portion of the media content signal in at least one of the one or more signal frequency ranges to form the adjusted media content signal.

13. An audio device, comprising:
an audio speaker that is configured to generate an audible signal based on a received media content signal that comprises a media containing file;
one or more microphones that are configured to detect the audible signal generated by the audio speaker; and
an audible signal processor that comprises a processor and an algorithm stored in memory, wherein the algorithm comprises a number of instructions which, when executed by the processor, causes the audible signal processor to perform operations comprising:

analyzing the received media content signal, wherein analyzing the received media content signal comprises determining a characteristic of the received media content signal in one or more signal frequency ranges within an acoustic spectrum of the received media content signal;

analyzing the audible signal detected by the microphone, wherein analyzing the detected audible signal comprises determining a characteristic of the audible signal in one or more signal frequency ranges within an acoustic spectrum of the detected audible signal;

comparing a characteristic of a first frequency range of the one or more signal frequency ranges of the detected audible signal and the received media content signal to determine a difference;

attenuating or enhancing a portion of the media content signal in at least one of the one or more signal frequency ranges to form an adjusted media content signal, wherein the adjustment of the media content signal is based on the determined difference; and generating, by the audio speaker, an adjusted audible signal based on the adjusted media content signal.

14. The audio device of claim 13, wherein determining the characteristic of the first frequency range of the detected audible signal comprises determining a root-mean-squared (RMS) value of the detected audible signal within the first frequency range, and determining the characteristic of the received media content signal comprises determining a root-mean-squared (RMS) value of the media content signal within the first frequency range.

15. The audio device of claim 13, wherein the first frequency range comprises a frequency range between 20-300 Hz.

16. The audio device of claim 15, wherein the attenuating or enhancing the portion of the media content signal in at least one of the one or more signal frequency ranges comprises attenuating the media content signal found within the frequency range between 20-300 Hz.

17. The audio device of claim 13, wherein the attenuating or enhancing the portion of the media content signal in at least one of the one or more signal frequency ranges comprises attenuating the media content signal found within the frequency range between 100-300 Hz.

18. The audio device of claim 13, wherein the media containing file comprises an artistic composition.

19. The audio device of claim 18, wherein the artistic composition comprises music.

20. The audio device of claim 13, wherein the adjustment of a characteristic of media content signal occurs dynamically during generation of an audible signal that comprises at least a portion of a media containing file.

21. A method of generating an audible signal, comprising:
generating, by an audio speaker, an audible signal based on a received media content signal that comprises a media containing file;

detecting, by a microphone, the audible signal generated by the audio speaker;

processing the detected audible signal, wherein processing the detected audible signal comprises:
adjusting a sound level of the detected audible signal relative to a reference level;
separating the detected audible signal into one or more frequency bands;
determining a root-mean-square (RMS) value of the detected audible signal within at least one of the one or more frequency bands; and
time smoothing the detected audible signal within each of one or more frequency bands;

generating a reference signal from the received media content signal;

processing the reference signal, wherein processing the reference signal comprises:
adjusting a sound level of the generated reference signal relative to a reference level;
separating the generated reference signal into one or more frequency bands;
determining a root-mean-square (RMS) value of the generated reference signal within at least one of the one or more frequency bands; and
time smoothing the generated reference signal within each of one or more frequency bands;

comparing the time smoothed reference signal and the time smoothed detected audible signal to determine a difference in sound quality in at least one of the one or more frequency bands of the time smoothed reference signal and the time smoothed detected audible signal;

adjusting a characteristic of a received media content signal to form an adjusted media content signal, wherein adjusting the received media content signal is based on the comparison of the time smoothed reference signal and the time smoothed detected audible signal; and generating an audible signal based on the adjusted media content signal.

22. The method of claim 21, wherein the at least one of the one or more frequency bands comprises a frequency range between 20-300 Hz.

23. The method of claim 21, wherein adjusting the characteristic of media content signal comprises attenuating a portion of the media content signal found within the frequency range between 20-300 Hz.

24. The method of claim 21, wherein adjusting the characteristic of media content signal comprises attenuating a portion of the media content signal found within the frequency range between 100-300 Hz.

* * * * *